Sept. 20, 1955 W. E. BRILL 2,718,220
POPPET VALVE PROTECTION CUP
Filed Feb. 3, 1953

Inventor
William E. Brill
By Willits, Helwig & Baillio
Attorneys

United States Patent Office 2,718,220
Patented Sept. 20, 1955

2,718,220

POPPET VALVE PROTECTION CUP

William E. Brill, Cleveland, Ohio, assignor to General Motors Corporation, Detroit, Mich., a corporation of Delaware Application February 3, 1953, Serial No. 334,843

9 Claims. (Cl. 123—188)

This invention relates to poppet valves for internal combustion engines, pumps, etc., and particularly to means for seating and supporting such valves.

In conventional structures of this type the cylinder head or other structure defining the ports controlled by the valves tend to distort a certain amount under the thermal and other stresses imposed thereon in operation, causing ovalizing of the valve seats and consequent unsatisfactory closure of the valves. Also, in the event of breakage of the valve stem in operation the valve head is allowed to interfere with the reciprocating piston of the engine or pump, causing considerable damage and a complete breakdown of the apparatus.

It is one of the principal objects of the present invention to provide means to insulate the valve seat from any distortions of the cylinder head in operation and to insure against the valve head coming in contact with the reciprocating piston in the event of failure of the stem or its connection to the valve reciprocating means.

The invention has particular application to poppet valves which are mounted in a valve housing inserted into a bore in an engine cylinder head such as is disclosed in the copending United States application of Gregory Flynn, Jr., Serial Number 293,808, filed June 16, 1952. However, its use is not limited to valves of this particular type, but is considered to be adaptable to poppet valves and seats generally. The invention comprises the employment of a generally cup-shaped member arranged to seat in an opening in the cylinder head below the poppet valve head, the cup having side walls embracing the valve head and having an end wall with an aperture accommodating substantially unrestricted flow of fluid into and out of the cylinder when the valve is open, but which aperture is of slightly smaller size than the valve head so as to retain the valve head within the cup in the event of valve failure in operation.

A further object of the invention is to provide such a valve cup of the aforementioned form which is made of a softer material than the associated cylinder head so as to adapt itself to all thermal and other distortions of the cylinder head in operation, and arranged to slidably support the valve seat for transverse movement relative to the cup and thereby insulate the valve seat from all such distortions of the cylinder head.

These and other objects of the invention will be more thoroughly understood from the following description of a preferred embodiment thereof in which reference is made to the attached drawing, wherein.

Figure 1:
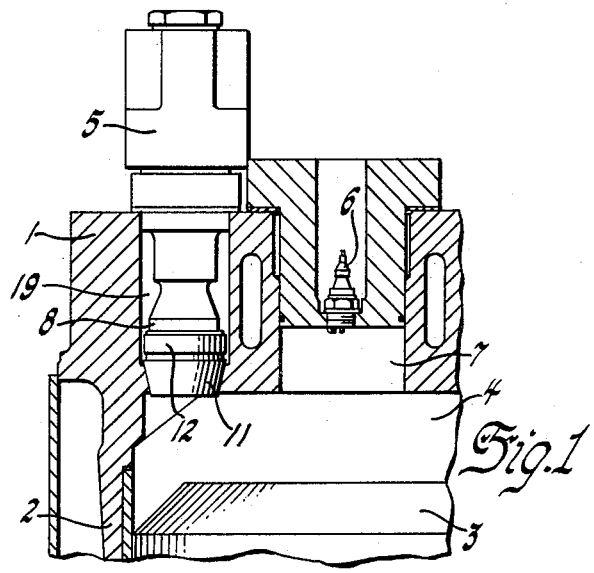
Figure 1 is a sectional view of a portion of an internal combustion engine cylinder unit showing my invention as employed in conjunction with one form of an automatic gas inlet valve mounted in the cylinder head.

Referring now in detail to the drawing, the numeral 1 designates generally an internal combustion engine cylinder head closing one end of the engine cylinder 2 in which is reciprocated a conventional engine piston 3. Within the cylinder and between the piston and cylinder head is the engine combustion chamber 4 into which gas fuel is introduced by an automatic gas fuel inlet valve assembly indicated generally at 5. A spark plug 6 is also shown mounted adjacent the valve assembly 5 in a central recess 7 communicating with the upper end of the combustion chamber 4.

The details of the valve assembly 5 and its manner of operation form no part of the instant invention and are not important thereto beyond the showing of the poppet valve 18 itself which is mounted for reciprocation in a bore 19 formed in the cylinder head and is provided with a valve seating member 8 shown in the form of a housing surrounding the poppet valve stem and having its lower end free to shift laterally within the cylinder head bore 7. Other details of the valve assembly 5 are described and shown in the aforesaid Flynn application.

Figure 2:
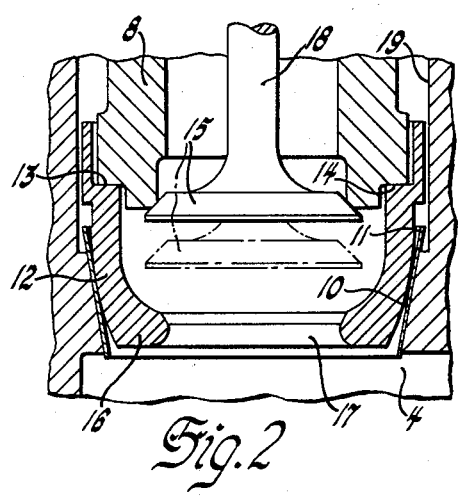
Figure 2 is an enlarged fragmentary view of the lower end of the valve of Figure 1 with parts broken away and in section to show the relation of the cylinder head, valve seat and valve protection cup.
Figure 3:
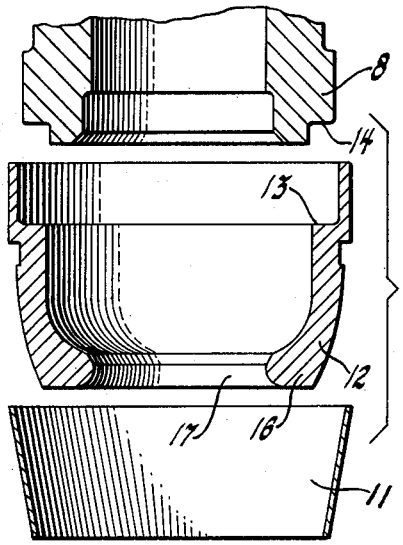
Figure 3 is an exploded view of the valve housing, cup and gasket shown in Figure 2.

As will best be seen in Figure 2 the cylinder head bore 19 terminates at its entrance to the combustion chamber 4 in a tapered seating surface 10 and lining this seating surface is a thin sheet metal gasket 11 which may be made of copper or other relative ductile materials having good heat conducting properties. Seated against the gasket 11 is a generally cup-shaped member 12 whose side walls extend into and have a loose clearance fit within the bore 19. The upper open end of the cup is counter-bored as shown to loosely receive the lower end of the housing 8, and the end of this counterbore forms a shoulder 13 on which slidably abuts a cooperating shoulder 14 formed adjacent the lower end of the housing 8. The poppet valve 18 as shown in solid lines in Figure 2 has its head 15 seating on the lower end of the housing 8 when in closed position, and the side walls and end wall 16 of the cup provide sufficient clearance around the valve head to accommodate substantially unrestricted flow of gas fuel when the valve is in its open position (indicated in broken lines). An opening 17 in the cup end wall is made sufficiently large for this purpose yet is slightly smaller than the valve head so as to prevent the latter from passing through the opening 17 in the event of breakage of the poppet valve stem.

The cup 12 is preferably made of Monel metal or equivalent material which is enough softer than the material of the cylinder head so as to adapt itself to any distortions of the cylinder head in operation, and, by reason of the sliding abutment between the cup and housing shoulders 13 and 14 and the freedom for lateral displacement of the lower end of the housing, any distortions of the cylinder head are insulated from the valve housing. As a result, the seating surface on the housing 8 for the valve head 15 is relieved of all strains which otherwise might be transmitted to it from the cylinder head and proper seating of the valve is insured at all times.

A further feature of the invention is that the end wall 16 of the cup serves as an emergency seat for the valve head in the event of breakage or disengagement of the stem from its reciprocating means. In the event of such breakage the valve head will engage the cup end wall and prevent discharge of gas from the housing 8 into the combustion chamber. Also, by reason of the cup thus retaining the valve head opposite its seat on the housing, in the event of valve breakage the valve head will be forced back onto its seat on the housing by the increasing pressures created in the combustion chamber during the next compression stroke of the engine piston 3, preventing combustion chamber gases from being blown back into the gas fuel supply line.

While only one specific structural embodiment of the invention has been shown and described for purposes of illustration it is appreciated that various minor modifications may be made without departing from the spirit and scope of the invention as defined in the following claims.

I claim:

1. In combination with cylinder head having a bore therethrough, a poppet valve including a valve head and a stem, a valve housing mounted in said bore and forming a passage surrounding the stem and terminating in a seat for the valve head, and a generally cup-shaped member mounted in said bore adjacent said valve seat and having side walls loosely surrounding the valve head within said bore and forming a retaining seat for said housing, the bottom wall of said member having an opening slightly smaller than the valve head to prevent the valve from passing through the head in the event of breakage of the stem in operation.

2. In combination with a poppet valve including a head and a stem, a valve housing forming a valve controlled passage surrounding the stem and terminating at one end in a seat for the head, a cylinder head having a bore surrounding said housing and terminating at one end in a restricted opening opposite and spaced from said end of the housing, and a cup-shaped member of softer material than the cylinder head seated in said opening and having its end wall spaced opposite said valve head, said end wall having an opening accommodating substantially unrestricted flow of fluid passing said valve head when the valve is in open position, said member having its side walls loosely spacing the external periphery of the housing within said bore and formed with a shoulder in supporting abutment with said end of the housing.

3. In a cylinder assembly for an internal combustion engine or the like, a cylinder, a cylinder head having a bore terminating with an inwardly tapered opening to the interior of the cylinder, a cup having side walls seated in said tapered opening and terminating thereabove in loose fitting engagement with said bore, the end wall of said cup being disposed below said opening and provided with an aperture, an upwardly facing shoulder on the inner periphery of said side walls, an elongated housing inserted in said bore and terminating at one end within said cup, said housing end slidably abutting said shoulder and having clearance for lateral displacement relative to said cup and bore, and a poppet valve reciprocable in said housing having its head between said housing end and the end wall of said cup, said housing forming a valve closable passage terminating within said cup with a seat for the valve head.

4. In combination with an internal combustion engine cylinder head having a bore terminating in a tapered entrance to the engine combustion chamber, a poppet valve having a head reciprocable in said bore, a hollow housing surrounding the valve within said bore and forming a seat for the valve head inwardly of the bore from said entrance, and a cup-shaped member seated in said tapered entrance, said cup-shaped member embraceably receiving and forming a seat for the housing, said cup-shaped member having its end wall provided with an aperture accommodating substantially unrestricted passage of fluid between the interiors of the housing and cylinder when the valve is open but sufficiently smaller than the valve head to prevent the valve head from passing therethrough.

5. In combination with a cylinder head having a gas fuel inlet passage and a poppet valve having a head controlling gas fuel delivery through said passage, a member within said passage and spaced from the exit end thereof forming a seat for the valve head, and a cup mounted in said passage in receiving relation with the valve head, said cup being formed with a shoulder in supporting abutment with said member.

6. In combination, a member forming one wall of a chamber and having a passage opening into said chamber, an internally tapered surface on said member defining the chamber end of said passage, a cup having its side walls seated on said tapered surface and its open end extending into the passage from said chamber in loosely fitting relation to the internal periphery of the passage above said tapered surface, a shoulder on the internal periphery of the cup side walls, a poppet valve reciprocable in said passage, and seating means for said valve in slidable abutment with said shoulder and having freedom for lateral movement relative to the passage and cup.

7. In combination with an internal combustion engine cylinder head having a bore terminating in a tapered entrance to the engine combustion chamber, a poppet valve having a head reciprocable in said bore, a hollow housing surrounding the valve within said bore and forming a seat for the valve head inwardly of the bore from said entrance, and a member of softer material than the cylinder head seated in said entrance, and formed with a shoulder in supporting abutment with said housing.

8. In combination with a cylinder head having a fuel inlet passage and a poppet valve having a head controlling fuel delivery through said passage, a housing within said passage and spaced from the exit end thereof forming a seat for the valve head, and a member of softer material than the cylinder head mounted in said passage, said member having side walls loosely spacing the external periphery of the housing within the passage and formed with a shoulder in slidable supporting abutment with the housing.

9. In combination with a cylinder head having a bore therethrough, a poppet valve including a valve head and stem, a valve housing terminating in a seat for the valve head mounted in said bore and forming a passage surrounding the stem, and a member mounted in said bore adjacent said valve seat and having side walls surrounding the valve head, said member having an upwardly facing shoulder slidably abutting the end of said housing.

References Cited in the file of this patent

UNITED STATES PATENTS

| | | |
|---|---|---|
| 895,056 | Sprado | Aug. 4, 1908 |
| 1,540,458 | Burtnett | June 2, 1925 |